United States Patent [19]
Ohmori et al.

[11] 4,270,809
[45] Jun. 2, 1981

[54] DEVICE FOR DIAGNOSING TROUBLE IN A CONTROL CIRCUIT FOR ELECTROMAGNETIC ACTUATORS

[75] Inventors: Taiji Ohmori, Kawagoe; Makoto Sato, Kamifukuoka, both of Japan

[73] Assignee: Honda Giken Kogyo Kabushiki Kaisha, Tokyo, Japan

[21] Appl. No.: 35,539

[22] Filed: May 3, 1979

[51] Int. Cl.³ .............................................. B60T 17/22
[52] U.S. Cl. ......................................... 303/92; 371/25
[58] Field of Search ................. 303/92; 340/52 B, 514, 340/516; 324/73 AT, 73 R, 424; 371/25

[56] References Cited
U.S. PATENT DOCUMENTS 3,750,101  7/1973  Granlund .......................... 303/92 X
4,106,820  8/1978  Ruhnau et al. ........................ 303/92
4,106,821  8/1978  Brearley ................................ 303/92

Primary Examiner—J. D. Miller
Assistant Examiner—Reinhard J. Eisenzopf
Attorney, Agent, or Firm—Haseltine & Lake

[57] ABSTRACT

A trouble diagnosing device for diagnosing a fault in a control circuit for controlling a plurality of electromagnetic actuators in an operating system such as a brake system. The control circuit receives a plurality of mutually independent input signals for individually controlling the operations of the electromagnetic actuators. The trouble diagnosing device includes an analog signal oscillator for feeding a trouble diagnosing analog signal to the control circuit and a trouble diagnosing circuit receiving the output signals from the control circuit for producing output signals indicating fault in the control circuit when the output signals of the control circuit include an abnormal signal.

14 Claims, 8 Drawing Figures

DEVICE FOR DIAGNOSING TROUBLE IN A CONTROL CIRCUIT FOR ELECTROMAGNETIC ACTUATORS

BACKGROUND OF THE INVENTION

1. Field of the Invention

The present invention relates to a device for diagnosing faults or trouble in a control circuit for electromagnetic actuators wherein the device sends control signals, independently for each controllable unit, to the electromagnetic actuators to actuate a plurality of the controllable units individually in order to diagnose the presence of any trouble in the control circuit, said circuit comprising a plurality of control systems in parallel with one another.

2. Description of the Prior Art

An electromagnetically-driven circuit system which is adapted to actuate electromagnetic actuators in response to control signals generated by a control circuit, has been heretofore employed in various fields including, for example, anti-skid control circuits in anti-skid brake devices. However, if the control circuit for controlling the operation of the electromagnetic actuator should fail and an erroneous control signal is fed, a series accident could take place. It is therefore necessary to discover any trouble in the control circuit as early as possible in order to take adequate action. To this end, the presence of trouble in a control circuit need be diagnosed from time to time. Generally speaking, however, it is not always easy to diagnose trouble in the control circuit for controlling the actuation of electromagnetic actuators, and particularly, no device has been proposed, which is suited to simply and positively diagnose trouble in a control circuit comprising a plurality of control systems in parallel with one another.

SUMMARY OF THE INVENTION

It is a primary object of the present invention to provide a device for diagnosing trouble in a control circuit for electromagnetic actuators, which can simply and accurately diagnose trouble in a control circuit, such as an anti-skid control circuit in anti-skid brake devices having a plurality of controlled systems connected in parallel with one another, and which is simple in design and may easily be incorporated into prior art control circuits for electromagnetic actuators.

A trouble diagnosing device is provided for diagnosing fault in a control circuit which controls a plurality of electromagnetic actuator means controlling respective operations of a plurality of controlled means each constituting an operating system. The trouble diagnosing device comprises control circuit means connected to receive a plurality of mutually independent input signals representative of the same information supplied to said respective controlled means for producing mutually independent output signals for individually controlling the operations of said electromagnetic actuator means; analog signal oscillator means for feeding a trouble diagnosing analog signal to said control circuit means; and a trouble diagnosing circuit means for receiving the output signals of said control circuit means for producing output signals indicating trouble in the control circuit means when said output signals of said control circuit means include an abnormal signal.

The above and other objects of the present invention will become apparent from the following detailed description when taken in conjunction with the accompanying drawings.

DESCRIPTION OF THE PREFERRED EMBODIMENTS

In the following, the present invention will be described with reference to an embodiment applied to a control circuit of an anti-skid brake device for a vehicle.

Figure 1:
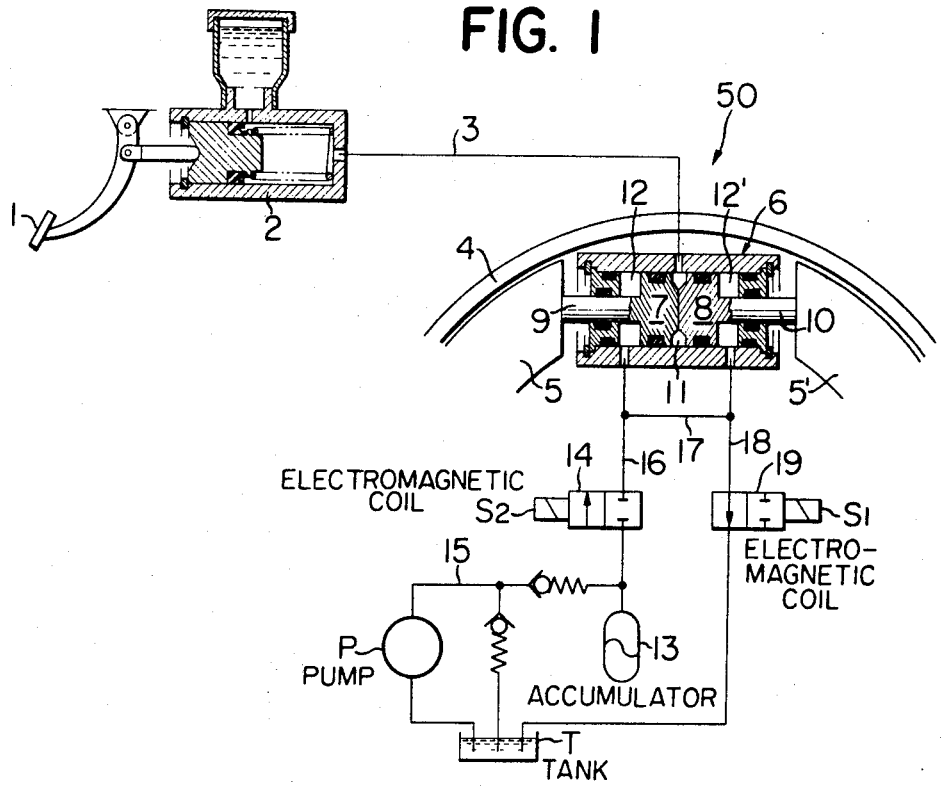
FIG. 1 is a diagrammatic illustration showing the principal portions of one embodiment of a braking system for a vehicle and one embodiment of a control system for controlling the operation of the braking system.

FIG. 1 shows one embodiment of a braking system for a vehicle and one embodiment of a control system for controlling the operation of the braking system. In FIG. 1, a brake pedal 1 is operatively connected to a master cylinder 2, and when the driver steps on the brake pedal 1, the master cylinder produces a braking oil pressure. The master cylinder 2 is connected through an oil passage 3 with a braking oil chamber 11 formed between a pair of pistons 7 and 8 within a wheel cylinder 6, mounted on a vehicle body, in a braking device 50 disposed on each wheel. The pistons 7 and 8 have respective rods 9 and 10 which extend outwardly through the end wall of the wheel cylinder. The wheel cylinder 6 extends within a brake drum 4 mounted in the wheel and the rods 9 and 10 have their outer ends connected to brake shoes 5' which can be placed into frictional contact with the brake drum 4 to produce the braking torque. Thus, when the brake pedal 1 is stepped on so that the master cylinder 2 produces the braking oil pressure, the braking oil pressure is transmitted into the braking oil chamber 11 in each braking device 50. As a result, the pistons 7 and 8 are urged away from each other, and accordingly, the brake shoes 5, 5' are urged against the frictional surface of the brake drum 4 to produce braking torque on the wheels.

If the braking oil pressure within the braking oil chamber 11 is too great, the braking torque produced between each of the brake shoes 5, 5' and the brake drum 4 becomes excessive, as a consequence of which the wheels are brought into a locked state. In order to prevent such a dangerous state, a pair of control oil chambers 12, 12' are formed between each of pistons 7, 8 and the end wall of the wheel cylinder 6. The control oil pressure within these control oil chambers 12, 12' may be controlled so that when any possibility of locking of the wheels due to excessively large braking oil pressure within the braking oil chamber 11 occurs, movement of the pistons 7 and 8 from braking oil pressure may be restrained.

Next will be described the control device for controlling the control oil pressure within the control oil chambers 12 and 12'. Pressurized control oil is pumped up by a pump P from an oil tank T through an oil passage 15 and a pressure accumulator 13 to a port on the inlet side of an inlet valve 14 which is actuated by an electromagnetic coil $S_2$, and a port on the outlet side of the inlet valve 14 is connected with the control oil chamber 12 through an oil passage 16 and with the control oil chamber 12' through an oil passage 17. The control oil chamber 12 is connected with a port on the inlet side of an outlet valve 19 which is actuated by an electromagnetic coil $S_1$, through the oil passage 16, oil passage 17 and oil passage 18, and the control oil chamber 12' is also connected with said port on the inlet side of the outlet valve 19 through the oil passage 18. A port on the outlet side of the outlet valve 19 is connected with the oil tank T.

The inlet valve 14 is normally held in a position displaced to the left in FIG. 1 (as shown) in which position, the control oil chambers 12, 12' are cut off from the pump P and pressure accumulator 13. When electromagnetic coil $S_2$ is energized to operate the inlet valve 14, the inlet valve 14 is displaced to the right in FIG. 1, and as a result, the control oil fed from the pump P is fed under pressure into the control oil chambers 12, 12' through the accumulator 13 and inlet valve 14 to urge the pistons 7 and 8 to approach each other against the pressure of the braking oil within the braking oil chamber 11.

The outlet valve 19 is normally held in a position displaced to the right in FIG. 1 (as shown) in which position, the control oil chambers 12, 12' are connected to the oil tank T through the outlet valve 19. When the electromagnetic coil $S_1$ is energized to operate the outlet valve 19, the outlet valve 19 is displaced to the left in FIG. 1, and the control oil chamber 12, 12' are cut off from the oil tank T.

In the consideration of a first position wherein neither of the electromagnetic coils $S_2$, $S_1$ is energized and both the inlet valve 14 and outlet valve 19 are in an inoperative state in which the inlet valve 14 is in the left position whereas the outlet valve 19 is in the right position, the control oil chambers 12, 12' are connected to the oil tank T and hence, the piston 7 and 8 are moved only by the braking oil pressure within the braking oil chamber 11. As a consequence, the braking torque at the time of braking increases freely in accordance with the braking action of the driver.

In the second state wherein only the electromagnetic coil $S_1$ is energized to operate the outlet valve 19 so that the latter is displaced to the left position, the control oil chambers 12, 12' are cut off from the oil tank T to place the control oil within the control oil chambers 12, 12' in a blocked state and thus, even if the braking oil pressure within the braking oil chamber 11 continues to increase, further movement of the pistons 7 and 8 is held in check. As a result, the braking torque at the time of braking is limited to a given magnitude irrespective of the braking action of the driver, and thus, the aforementioned second rate is adapted to the case in which the possibility of locking of the wheels occurs.

In the third state both electromagnetic coils $S_2$ and $S_1$ are energized to operate both inlet valve 14 and outlet valve 19 so that the inlet valve 14 is displaced to the right and the outlet valve 19 is displaced to the left position, control oil fed from the pump P is fed under pressure into the control oil chambers 12, 12' through the accumulator 13 and inlet valve 14 and the control oil chambers 12, 12' are cut off from the oil tank T. Consequently, the braking torque at the time of braking decreases irrespective of the braking action of the driver, and thus, the aforementioned third state is adapted for the case in which the wheels are being locked.

Figure 2:
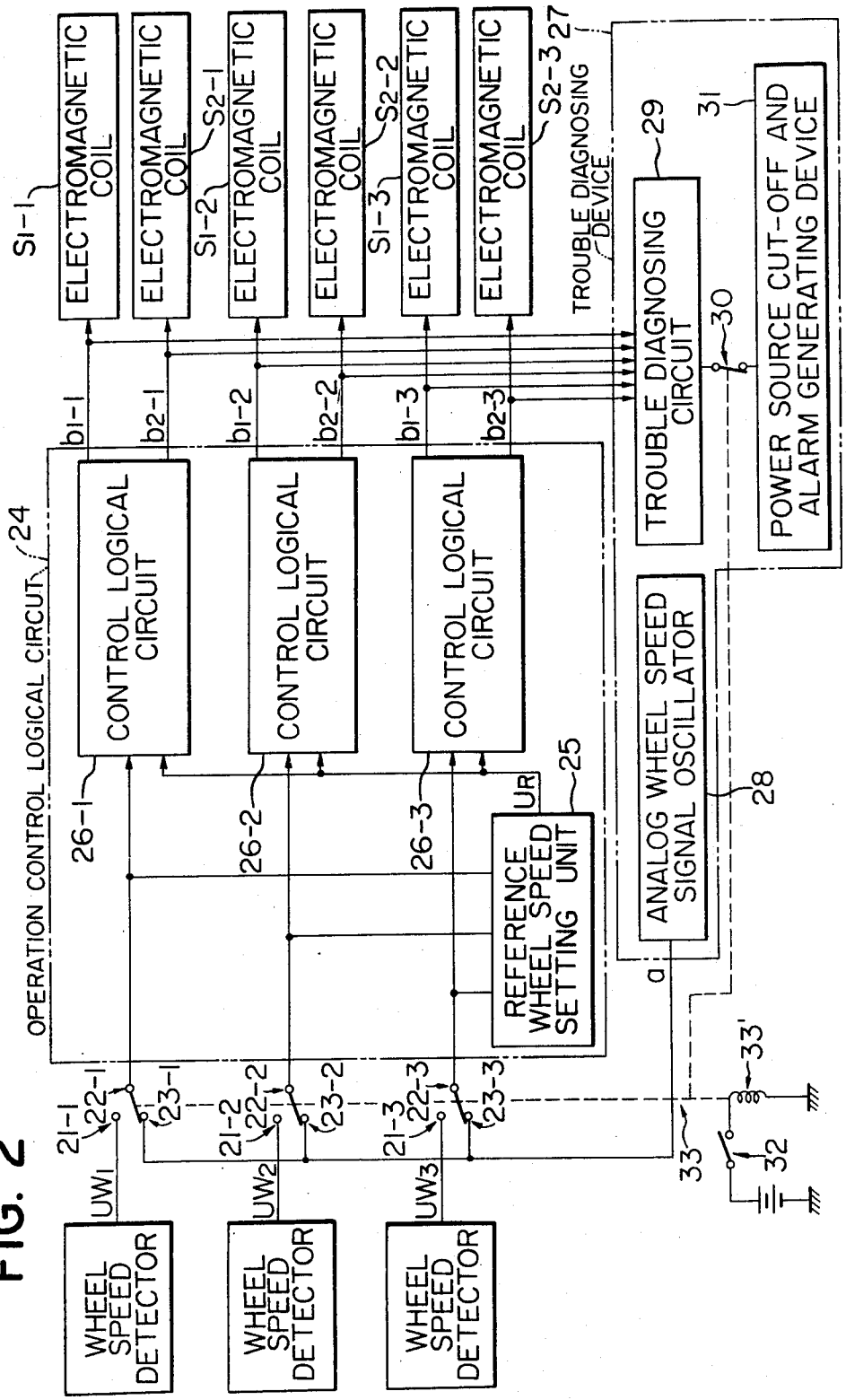
FIG. 2 is a block diagram showing one embodiment of a control circuit for operating the control system in FIG. 1 and one embodiment of a trouble diagnosing circuit in accordance with one embodiment of the present invention for diagnosing the presence of trouble in the control circuit.

FIG. 2 shows one embodiment of an anti-skid control system having three circuits which operate independently of each other with respect to three wheels, and one embodiment of a trouble diagnosing device 27 of an operation, control logical circuit device common for the three circuits.

The anti-skid control system will first be described. Three wheel speed detectors 20-1, 20-2 and 20-3 respectively detect the peripheral speed of first, second and third wheels and then feed wheel speed signals $U_{w1}$, $U_{w2}$, and $U_{w3}$ proportional to the peripheral speeds of the wheels to an operation, control logical circuit device 24 through a relay switch 33 interposed between contacts 21-1, 22-1; 21-2, 22-2; and 21-3, 22-3, respectively. In this case, the wheel speed detectors 20-1, 20-2 and 20-3 each include a frequency-voltage converter, in which the speed signal of each wheel is converted into a frequency signal which in turn is converted into an easily controllable voltage signal as an output signal.

The relay switch 33 is further provided with three contacts 23-1, 23-2 and 23-3, and an electromagnetic coil 33' energized by a brake switch 32 so that at the time of braking, the contacts 21-1, 21-2 and 21-3 are connected to the contacts 22-1, 22-2 and 22-3, respectively, and at the time of nonbraking, the contacts 23-1, 23-2 and 23-3 are connected to the contacts 22-1, 22-2 and 22-3, respectively.

Control logical circuit device 24 comprises a single reference wheel speed setting unit 25 and three control logical circuits 26-1, 26-2 and 26-3 one for the corresponding wheel. The reference wheel speed setting unit 25 is designed to receive wheel speed signals $U_{w1}$, $U_{w2}$, and $U_{w3}$ as input signals, and the vehicle speed U is estimated from these three wheel speed signals $U_{w1}$, $U_{w2}$ and $U_{w3}$, after which a reference wheel speed is set on the basis of said vehicle speed U and a reference wheel speed signal $U_R$ of value in proportion to the reference wheel speed is fed as an output signal to the control logical circuits 26-1, 26-2 and 26-3.

The control logical circuits 26-1, 26-2 and 26-3 are designed to receive, as input signals, corresponding wheel speed signals $U_{w1}$, $U_{w2}$ and $U_{w3}$ and the reference wheel speed signal $U_R$ fed from the reference wheel speed setting unit 25 and these signals are subjected to a logical operation to generate, as output signals, outlet valve actuating signals $b_1$-1, $b_1$-2 and $b_1$-3 adapted to energize electromagnetic coils $S_1$-1, $S_1$-2, and $S_1$-3 for actuating the three outlet valves 19 corresponding to the respective wheels and inlet valve actuating signals $b_2$-1, $b_2$-2 and $b_2$-3 adapted to energize electromagnetic coils $S_2$-1, $S_2$-2 and $S_2$-3 for actuating the three inlet valves 14 corresponding to the respective wheels. In this case, for example, where there is no possibility of locking the wheel j (j=1, 2, 3 in FIG. 2), neither outlet valve actuating signal $b_1$-j nor inlet valve actuating signal $b_2$-j is produced. When there occurs a possibility of locking the wheel j, only the outlet valve actuating signal $b_1$-j is produced; and when there is the likelihood of locking the wheel j, both outlet valve actuating signal $b_1$-j and inlet valve actuating signal $b_2$-j are produced.

Next, the trouble diagnosing device 27 will be described. The trouble diagnosing device 27 shown in FIG. 2 comprises an analog wheel speed signal oscillator 28 which produces an analog wheel speed signal a and is connected, at the time of non-braking, to the reference wheel speed setting unit 25 and to input sides of the control logical circuits 26-1, 26-2 and 26-3 through contacts 23-1, 22-1; 23-2, 22-2; and 23-3, 22-3 by the action of relay switch 33. The device 27 further comprises a trouble diagnosing circuit 29 which receives, as input signals, outlet valve actuating signals $b_1$-1, $b_2$-2, $b_1$-3 as output signals of the control logical circuit 26-1, 26-2 and 26-3 and inlet valve actuating signals $b_1$-1, $b_2$-2 and $b_2$-3 to produce an output signal l. The device 27 also includes a power source cut-off and alarm generating device 31 whose input is connected to the output of the trouble diagnosing circuit 29 through a normally closed contact 30 which is closed at the time of non-braking and opened at the time of braking by the action of the relay switch 33. When the output signal l of the trouble diagnosing circuit 29 takes an abnormal waveform due to a failure of the operation, control logical circuit device 27, cuts off the power source of the circuit 24 to provide a state in which braking is freely applied to the wheels and to generate an alarm.

Figure 3:
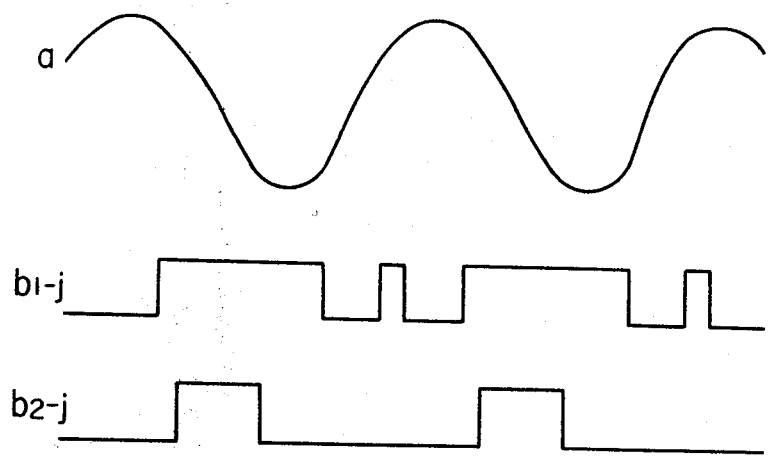
FIG. 3 shows signal waveforms showing one example of a trouble diagnosing analog signal and one example of an output signal of the control circuit when said analog signal is received as an input signal.

The analog wheel speed signal a produced by the analog wheel speed signal oscillator 28 has, for example, a regular sine waveform as shown in FIG. 3, and when the analog wheel speed signal a having such a sine waveform is fed to the reference wheel speed setting unit 25 and control logical circuits 26-1, 26-2 and 26-3 by the action of the relay switch 33, the control logical circuits 26-1, 26-2 and 26-3 produce an outlet valve actuating signal $b_1$-j (j=1, 2, 3) and an inlet value actuating signal $b_2$-j (j=1, 2, 3), which have a rectangular waveform as shown in FIG. 3.

Figure 4:
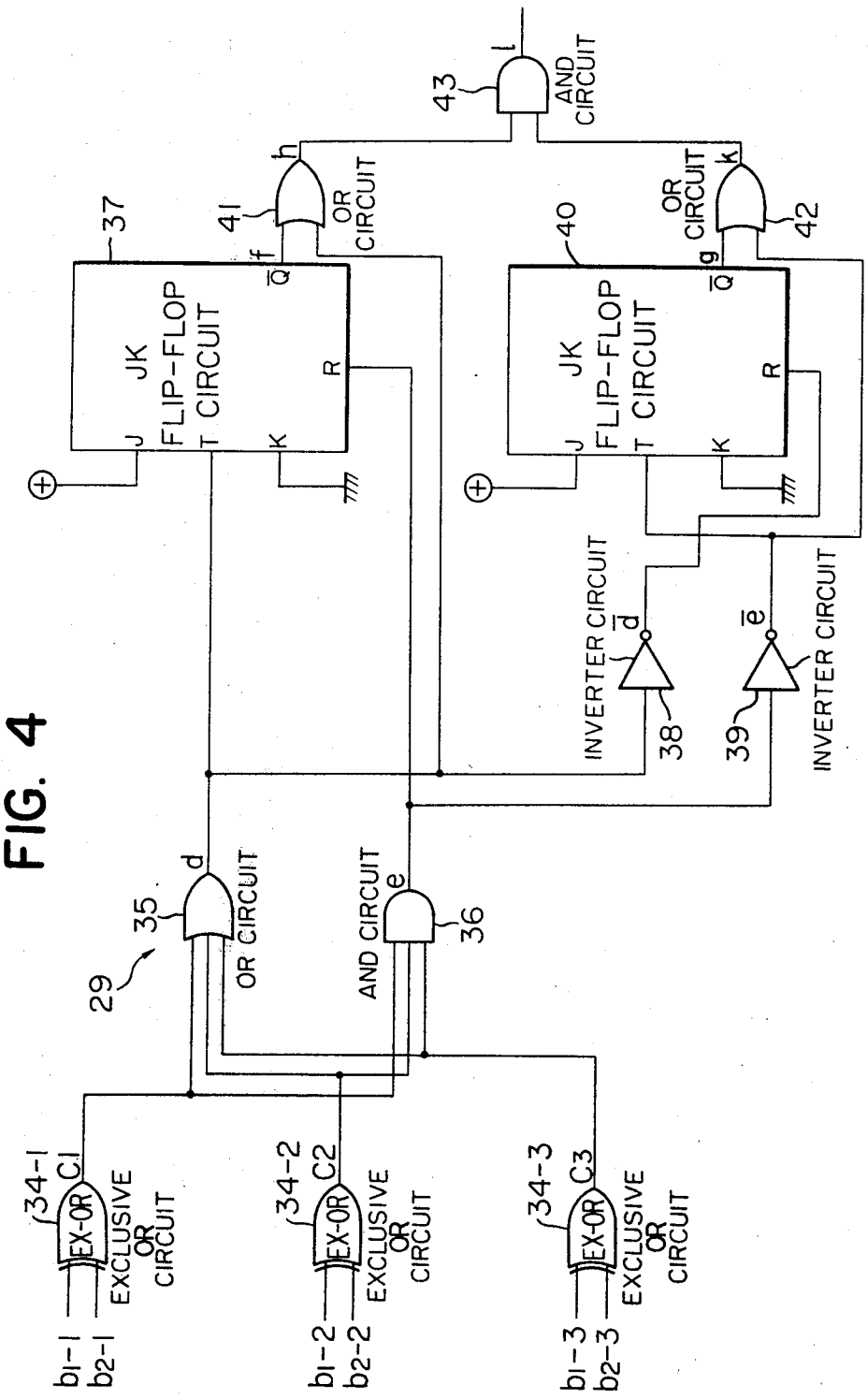
FIG. 4 is a logical circuit diagram showing one embodiment of a trouble diagnosing circuit.

FIG. 4 shows one embodiment of a detailed circuit diagram of the trouble diagnosing circuit 29. The trouble diagnosing circuit 29 comprises three EX-OR circuits 34-1, 34-2 and 34-3 which are exclusive OR circuits, in which the EX-OR circuit 34-1 receives an outlet valve actuating signal $b_1$-1 and an inlet valve actuating signal $b_2$-1 as input signals to produce, as an output signal, an exclusive-OR signal $c_1$ of both signals $b_1$-1; and $b_2$-1; the EX-OR circuit 34-2 receives, as input signals, an outlet valve actuating signal $b_1$-2 and inlet valve actuating signal $b_2$-2 to produce, as an output signal, an exclusive-OR signal $c_2$ of both signals $b_1$-2 and $b_2$-2; and the EX-OR circuit 34-3 receives, as input signals, an outlet valve actuating signal $b_1$-3 and inlet valve actuating signal $b_2$-3 to produce, as an output signal, an exclusive-OR signal $c_3$ of both signals $b_1$-3 and $b_2$-3.

It should be noted that the control logic circuits 26-1, 26-2 and 26-3 are generally respectively composed of a multiplicity of electronic circuit parts, and therefore, time widths or pulse widths of output signals produced by the control logic circuits 26-1, 26-2 and 26-3 are not always equal to one another mainly because of non-uniformity of these electronic circuit parts. Assuming now that of the output signals of the three control logical circuits 26-1, 26-2 and 26-3, the output signal of the control logic circuit 26-2 has the largest pulse width and the output signal of the control logical circuit 26-3 has the smallest pulse width, time-changes of the outlet valve actuating signals $b_1$-1, $b_1$-2, and $b_1$-3, inlet valve actuating signals $b_2$-1, $b_2$-2 and $b_2$-3, and exclusive OR signals $c_1$, $c_2$ $c_3$ at the time of non-braking are shown by the solid lines in FIG. 5, respectively.

Turning again to FIG. 4, the exclusive-OR signals $c_1$, $c_2$ and $c_3$ are all fed to an OR circuit as well as to an AND circuit 36. The OR circuit 35 receives the exclusive OR signals $c_1$, $c_2$ and $c_3$ as input signals to produce a signal d as shown by the solid line in FIG. 5 as an output signal, the signal d being fed to a JK flip-flop circuit 37, to an OR circuit 41, and to an inverter circuit 38 as well. The AND circuit 36 also receives the exclusive OR signals $c_1$, $c_2$ and $c_3$ as input signals to produce a signal e as shown by the solid line in FIG. 5 as an output signal, the signal e being fed to the JK flip-flop circuit 37 and to an inverter circuit 39.

Figure 5:
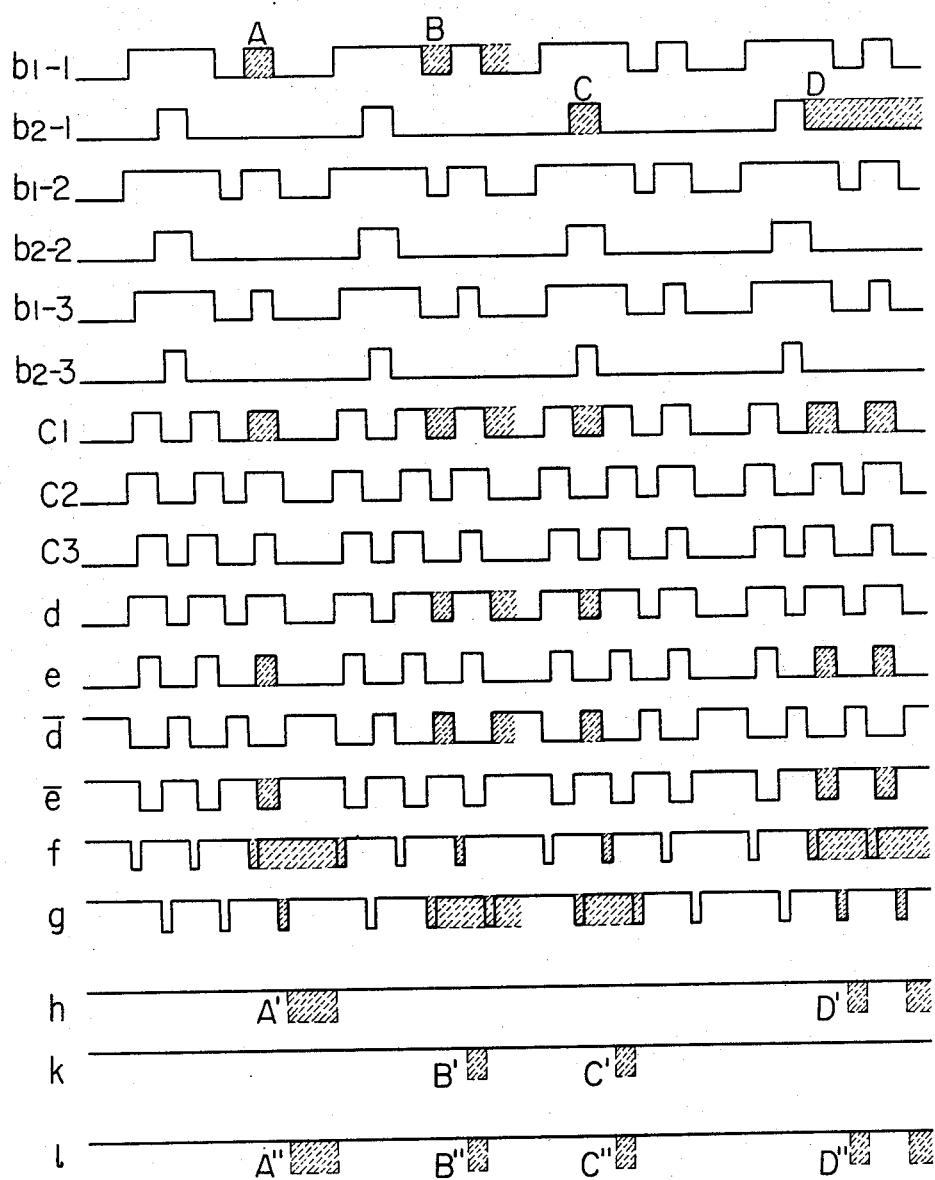
FIG. 5 shows waveforms of signals generated by the respective circuits shown in FIGS. 2 and 4.

The inverter circuit 38 receives the signal d to produce, as an output signal, a signal $\bar{d}$ as shown by the solid line in FIG. 5 in a state in which the signal d is inverted, the signal $\bar{d}$ being fed to a JK flip-flop circuit 40. The inverter circuit 39 receives a signal e as input to produce an inverted signal $\bar{e}$ as shown by the solid line in FIG. 5 as an output signal, the signal $\bar{e}$ being fed to the JK flip-flop circuit 40 and to an OR circuit 42.

The JK flip-flop circuit 37 is of the type having a reset with a logic signal [1] applied to logic input terminal J and a logic signal [0] applied to terminal K. The flip-flop circuit 37 receives the signal d as an input signal at the clock terminal T and the signal e as an input signal at reset terminal R to produce a signal f as shown by the solid line in FIG. 5 as an output signal from an output terminal $\bar{Q}$, the signal f being in a state with a signal, which is produced simultaneously with generation of the signal d and extinguished simultaneously with generation of the inverted signal e and hence in a state with a signal which is produced simultaneously with generation of the signal e and extinguished simultaneously with generation of the signal d.

The JK flip-flop circuit 40 has a reset terminal and logic signal [1] is applied to a logic input terminal J and a logic signal [0] is applied to terminal K. The flip-flop circuit 40 receives the signal $\bar{e}$ as an input signal at the clock terminal T and the signal $\bar{d}$ as an input signal at reset terminal R to produce a signal g as shown by the solid line in FIG. 5 as an output signal from an output terminal $\bar{Q}$, the signal g being in a state with a signal, which is produced simultaneously with generation of the signal $\bar{e}$ and extinguished simultaneously with generation of the inverted signal $\bar{d}$ and hence in a state with a signal which is produced simultaneously with generation of the signal $\bar{d}$ and extinguished simultaneously with generation of the signal $\bar{e}$.

The OR circuit 41 receives, as input signals, a signal d in the form of an output signal of the OR circuit 35 and a signal f in the form of an output signal of the JK flip-flop circuit 37 to produce a signal h as shown by the solid line in FIG. 5 as an output signal. The OR circuit 42 receives, as input signals, a signal $\bar{e}$ in the form of an output signal of the inverter circuit 39 and a signal g in the form of an output signal of the JK flip-flop circuit 40 to produce a signal k as shown by the solid line in FIG. 5 as an output signal. The AND circuit 43 receives, as input signals, a signal h in the form of an output signal of the OR circuit 41 and a signal k in the form of an output signal of the OR circuit 42 to produce a signal l as shown by the solid line in FIG. 5.

In the event analog wheel speed signal a produced by the analog wheel speed signal oscillator 28 is fed to the reference wheel speed setting unit 25 and control logical circuits 26-1, 26-2 and 26-3 by the action of the relay switch 33 as long as the operation, control logical circuit device 24 is in proper operation, both signal h in the form of an output signal from the OR circuit 41 and signal k in the form of an output signal from the OR circuit 42 form a linear waveform without any defect, as shown in FIG. 5, and accordingly, the signal l in the form of an output signal of the AND circuit 43 also forms a linear waveform without any defect.

Next, description will be given of the case in which trouble occurs in the operation of control logical circuit device 24. Trouble modes of operation for control logical circuit device 24 are considered to include four cases, that is, failure in pulse of the outlet valve actuating signal, non-extinction of the outlet valve actuating signal, failure in the inlet valve actuating signal and non-extinction of the inlet valve actuating signal. Assume, for example, that the failure of the outlet valve actuating signal occurs at a portion A of an outlet valve actuating signal $b_1$-1 in FIG. 5 as shown by the dotted line; the non-extinction of the outlet valve actuating signal occurs at a portion B of an outlet valve actuating signal $b_1$-1 in FIG. 5 as shown by the dotted line; the failure of the inlet valve actuating signal occurs at a portion C of the inlet valve actuating signal $b_2$-1 in FIG. 5 as shown by the dotted line; and the non-extinction of the inlet valve actuating signal occurs at a portion D of an inlet valve actuating signal $b_2$-1 in FIG. 5 as shown by the dotted line, the exclusive-OR signal $c_1$, signals $\bar{d}$, $\bar{e}$, d, e, f, and g take abnormal waveforms, respectively, as shown by the dotted lines in FIG. 5; portions A′ and D′ of the signal h form a failure in signal in the portion A of the outlet valve actuating signal $b_1$-1 and a failure in signal corresponding to the non-extinction of signal in the portion D of the inlet valve actuating signal $b_2$-1, respectively; and portions B′ and C′ of the signal k form the non-extinction of signal in the portion B of the outlet valve actuating signal $b_1$-1 and the signal failure corresponding to the signal failure in the portion C of the inlet valve actuating signal $b_2$-1, respectively. Consequently, the output signal of the AND circuit 43 or the signal l in the form of an outlet signal of the trouble diagnosing circuit 29 forms the signal failures corresponding to the signal failures of the portions A′, B′, C′ and D′ of the signal h or k, in the portions A″, B″, C″ and D″, respectively.

Figure 6:
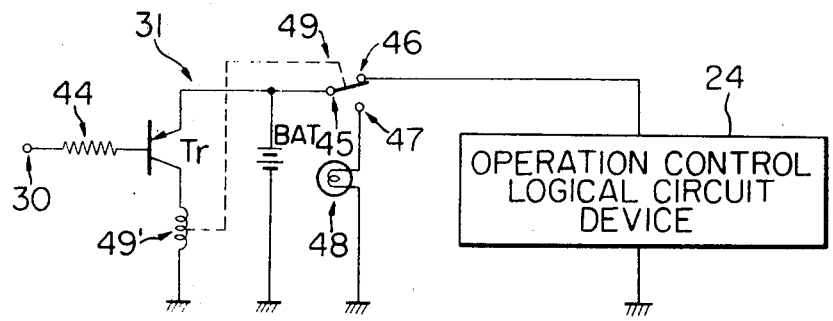
FIG. 6 is a circuit diagram showing one embodiment of a power source cut-off and alarm generator.

FIG. 6 shows one embodiment of the power source cut-off and alarm generator 31. Referring to FIG. 6, a PNP transistor $T_r$ whose base is connected to a normally closed contact 30 through a resistor 44, has its emitter connected to an anode of power source BAT and also to a contact 45 of a keep relay switch 49. The keep relay switch 49 further comprises a contact 46 grounded through the operation, control logical circuit 24, and a contact 47 grounded through an alarm 48, for example, an alarm lamp. The PNP transistor $T_r$ has its collector grounded through an electromagnetic coil 49′ for actuating the keep relay switch 49. When the electromagnetic coil 49′ is not energized, the keep relay switch 49 connects the contacts 45 and 46 and opens the contacts 45 and 47. However, when the electromagnetic coil 49′ is energized, the keep relay switch 49 opens the contacts 45 and 46 and connects the contacts 45 and 47, after which the condition remains unchanged.

Thus, since, at the time of non-braking, the normally closed contact 30 is placed in connection state by the action of the relay switch 33, the signal l in the form of an output signal of the trouble diagnosing circuit 29 is fed to the base of PNP transistor $T_r$ through the normally closed contact 30 and the resistor 44. When no trouble occurs in the operation, control logical circuit 24, no failure is produced in the signal l so that the PNP transistor $T_r$ is in a cut-off state and the electromagnetic coil 49′ is not energized, and as a result, the anode of the power source BAT is connected to the operation, control logical circuit 24, whereby the operation, control logical circuit 24 remains operated properly.

When trouble occurs in the operation, control logical circuit 24, there forms a failure in the signal l so that the base potential of the PNP transistor $T_r$ is lowered by the failure portion of the signal l to place the PNP transistor $T_r$ in conduction state, and as a result, the electromagnetic coil 49′ is energized, whereby the anode power source BAT is connected to the alarm 48 so that the latter produces a warning and the operation, control logical ciruit 24 is cut off from the anode of power source BAT to halt its operation, after which the condition remains unchanged.

In the embodiments of the present invention discussed above, where each control system has two control signals $b_1$-j and $b_2$-j, these signals are converted by the exclusive OR circuit into a single exclusive OR signal or an analog control signal $C_j$ so as to attribute the trouble of the operation, control logical circuit 24 to the failure and nonextinction of the analog control signal $C_j$ and to utilize unevenness of pulse width present between the control systems thereby simplifying the trouble diagnosing device 27. This can be used, in a further generalized form, as a system using an exclusive OR circuit employed for a method for producing a single analog control signal $C_j$ from more than two control signals $B_i$-j (i=1,2, . . . m; j=1,2, . . . n) for every control system. This system is applicable to the case in which as illustrated in the foregoing embodiments, there are two control signals for every control system, and one signal $b_2$-j will not be produced except for the period during which the other signal $b_1$-j is produced.

Alternatively, in the case there are more than two control signals $b_i$-j for every control system and more than two signals are not produced simultaneously, an OR circuit can be used in place of the exclusive OR circuit.

Figure 7:
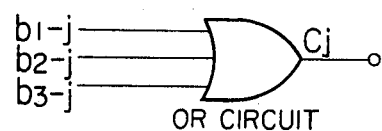
FIG. 7 is a circuit diagram showing a modification of the analog control signal generating logical circuit in FIG. 4.

In FIG. 7 there is shown a logical circuit for producing an analog control signal $c_j$ from control signals $b_1$-j, $b_2$-j, and $b_3$-j in case there are three control signals for every control system, that is, in the case of j=3, under the conditions noted abovre, and FIG. 7 essentially shows an OR circuit for receiving all of control signals $b_1$-j, $b_2$-j and $b_3$-j as input signals.

Figure 8:
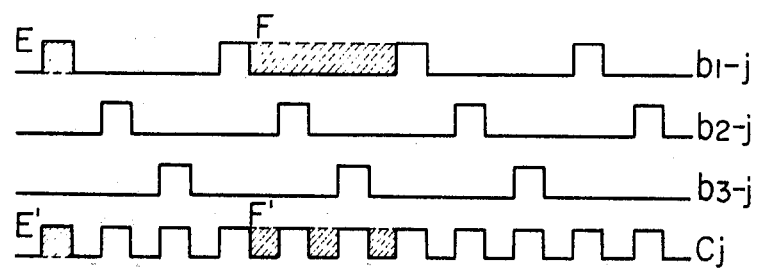
FIG. 8 shows signal waveforms showing an example of the input and output signals in analog control signal generating logical circuit of FIG. 7.

FIG. 8 shows signal waveforms for explaining the operation of the circuit shown in FIG. 7. In FIG. 8, in case the control signals $b_1$-j, $b_2$-j and $b_3$-j are not produced more than two simultaneously as shown by the solid lines, the OR circuit of FIG. 7 for receiving all of the control signals $b_1$-j, $b_2$-j and $b_3$-j as input signals produces an output signal $c_j$ shown by the solid line in FIG. 8. Accordingly, for example, where a signal failure occurs in portion E of the control signal $b_1$-j, a signal failure as shown by the dotted line in portions E′ occurs also in the output signal $c_j$, and where a signal non-extinction occurs in portion F of the control signal $b_{1-j}$, a signal non-extinction as shown by the dotted line occurs in protion F' of the output signal $c_j$, so that the output signal $c_j$ may be used as the analog control signal in the trouble diagnosing device in accordance with the present invention.

What is claimed is:

1. A trouble diagnosing device for diagnosing trouble in a control circuit for controlling a plurality of electromagnetic actuators comprising: a plurality of controlled means each constituting an operating system; a plurality of electromagnetic actuator means for controlling respective operation of said controlled means; control circuit means connected to receive a plurality of mutually independent input signals representative of the same information supplied to said respective controlled means for producing a plurality of paired output signals for individually controlling the operations of said electromagnetic actuator means; analog signal oscillator means for feeding a trouble diagnosing analog signal to said control circuit means; analog signal producing logical circuits each including a logical exclusive OR circuit adapted to receive the paired output signals of said control circuit means and produce, after logical processing of said paired output signals, a single output signal; and a trouble discriminating logical circuit connected to said analog signal producing logical circuits for producing an output signal indicative of trouble in said control circuit means when said output signals of said logical exclusive OR circuits includes an abnormal signal.

2. A trouble diagnosing device for diagnosing trouble in a control circuit for controlling a plurality of electromagnetic actuators comprising: a plurality of controlled means each constituting an operating system; a plurality of electromagnetic actuator means for controlling respective operations of said control means; control circuit means connected to receive a plurality of mutually independent input signals representative of the same information supplied to said respective controlled means for producing mutually independent output signals for individually controlling the operations of said electromagnetic actuator means; analog signal oscillator means for feeding a trouble diagnosing analog signal to said control circuit means; a trouble diagnosing circuit means for receiving the output signals of said control circuit means for producing output signals indicating trouble in the control circuit means when said output signals of said control circuit means include an abnormal signal; said trouble diagnosing circuit means comprising: analog signal producing logical circuits each producing a single analog control signal for each of said operating systems on the basis of the output signals which said control circuit means produces upon receipt of said analog signal from said oscillator means; a trouble discriminating logical circuit connected to said analog signal producing logical circuits to produce output signals indicative of trouble in said control circuit means when said analog control signals include an abnormal signal; said trouble discriminating circuit comprising: a first logical circuit connected to all of said analog control signal producing logical circuits to produce a single output signal upon receipt of at least one of said analog control signals; a second logical circuit connected to all of said analog signal producing logical circuits and to produce a single output signal upon receipt of all of said analog control signals; flip-flop circuit connected to said first and second logical circuits and to produce upon receipt of the output signal of said second logical circuit an output signal which is extinguished upon receipt of an output signal from said first logical circuit; and a third logical circuit connected to said first logical circuit and said flip-flop circuit to produce upon receipt of at least one of the output signals from said first logical circuit and said flip-flop circuit an output signal which is extinguished when there is an abnormal signal in said analog control signals for detecting trouble in said control circuit means.

3. A trouble diagnosing device as claimed in claim 2, wherein said first logical circuit comprises an OR gate, said second logical circuit comprises an AND gate and said third logical circuit comprises an OR gate.

4. A trouble diagnosing device as claimed in claim 2, wherein said trouble discriminating logical circuit comprises: a first logical circuit connected to all said analog control signal producing logical circuits to produce a single output signal upon receipt of none of said analog control signals; a second logical circuit connected to all said analog control signal producing logical circuits to produce a single output signal upon non-receipt of all of said analog control signals; a flip-flop circuit connected to said first and second logical circuits to produce upon receipt of the output signal from said first logical circuit an output signal which is extinguished upon receipt of the output signal from said second logical circuit; a third logical circuit connected to said second logical circuit and said flip-flop circuit to produce upon receipt of at least one of the output signals from said second logical circuit and said flip-flop circuit an output signal which is extinguished when there is an abnormal signal in said analog control signals for detecting trouble in said control circuit means.

5. A trouble diagnosing device as claimed in claim 4, wherein said first logical circuit comprises an OR gate having an output and an inverter having an input connected to the output of said OR gate, and said second logical circuit comprises an AND gate having an output and an inverter having an input connected to the output of said AND gate.

6. A trouble diagnosing device as claimed in claim 2, wherein said trouble discriminating logical circuit comprises: a first logical circuit connected to all said analog control signal producing logical circuits to produce a single output signal upon receipt of at least one of said analog control signals; a second logical circuit connected to all said analog control signal producing logical circuits to produce a single output signal upon receipt of all said analog control signals; a third logical circuit connected to said first logical circuit to produce a single output signal when said first logical circuit produces no output signal; a fourth logical circuit connected to said second logical circuit to produce a single output signal when said second logical circuit produces no output signal; a first flip-flop circuit connected to said first and second logical circuits to produce upon receipt of the output signal from said second logical circuit an output signal which is extinguished upon receipt of the output signal from said first logical circuit; a second flip-flop circuit connected to said third and fourth logical circuit to produce upon receipt of the output signal from said third logical circuit an output signal which is extinguished upon receipt of the output signal from said fourth logical circuit; a fifth logical circuit connected to said first logical circuit and said first flip-flop circuit to produce an output signal upon receipt of at least one of the output signals from said first logical circuit and said first flip-flop circuit, a sixth logical circuit connected to said fourth logical circuit and said second flip-flop circuit to produce an output signal upon receipt of at least one of the output signal from said fourth logical circuit and said second flip-flop circuit; and a seventh logical circuit connected to said fifth and sixth logical circuits to produce upon receipt of both the output signals from said fifth and sixth logical circuits an output signal which is extinguished when said analog control signal include an abnormal signal for detecting trouble in said control circuit.

7. A trouble diagnosing device as claimed in claim 6, wherein said first logical circuit comprises an OR gate, said second logical circuit comprises an AND gate and said third logical circuit comprises an inverter, said fourth circuit comprises an inverter, said fifth and sixth logical circuits respectively comprise an OR gate and said seventh logical circuit comprises an AND gate.

8. A trouble diagnosing device as claimed in claim 2, comprising a power cut-off and alarm means for cutting off power to said control circuit means and for generating a warning signal when said trouble diagnosing circuit means produces output signals representative of trouble in said control circuit means.

9. A trouble diagnosing device as claimed in claim 8, wherein said power cut-off and alarm means includes a keep relay switch means operable to cut off power and generate the warning signal when said trouble diagnosing circuit means produces output signals representative of trouble in said control circuit means, said keep relay switch means thereafter keeping the power cut-off and warning condition unchanged irrespective of the output signals from said trouble diagnosing circuit means.

10. A trouble diagnosing device as claimed in claim 2 wherein said analog signal producing logical circuits include exclusive OR gates.

11. In an anti-skid brake apparatus including: fluid pressure operated brake means on at least two wheels of a vehicle for applying a brake force to each wheel; inlet valve means for feeding control fluid to said brake means to control the brake forces of said brake means; outlet valve means for discharging the control fluid from said brake means; and an operation and control logical circuit means for controlling the operations of said inlet and outlet valve means in response to wheel speed signals indicative of the respective speeds of said wheels at the time of braking such that (a) said inlet and outlet valves means are deactuated to permit the brake force applied to said wheels to increase freely when there is no possibility of locking of said wheels (b) said outlet valve means are actuated to restrict the brake force applied to said wheels when there is a possibility of wheel locking, and (c) said inlet and outlet valve means are actuated to decrease the brake force applied to said wheels when the wheel is being locked; trouble diagnosing means for diagnosing trouble in said operation and control logical circuit means comprising: analog wheel speed signal oscillator means for supplying an analog wheel speed signal to said operation and control logical circuit means in place of said wheel speed signals during non-braking; and a trouble diagnosing circuit means receiving outlet valve actuation signals and inlet valve actuating signals produced by said operation and control logical circuit means for producing an output signal indicative of trouble in said operation and control logical circuit means when said outlet and inlet valve actuation signals include an abnormal signal; said trouble diagnosing circuit means comprising: first logical circuits connected to said operation and control logical circuit means and each producing a logical exclusive OR signal when receiving alternatively an outlet valve actuation signal or an inlet valve actuation signal both associated with one pair of said inlet and outlet valve means; a second logical circuit connected to all said first logical circuits to produce a single output signal upon receipt of at least one logical exclusive OR signal; a third logical circuit connected to all said first logical circuits to produce a single output signal upon receipt of all said logical exclusive OR signals; a fourth logical circuit associated with all of said first logical circuits for producing a single output signal upon receipt of one of said logical exclusive OR signals; a fifth logical circuit associated with all said first logical circuits for producing a single output signal upon non-receipt of all of said logical exclusive OR signals; a first flip-flop circuit connected to said second and third logical circuits to produce upon receipt of the output signal from said third logical circuit an output signal which is extinguished upon recept of the output signal from said second logical circuit; a second flip-flop circuit connected to said fourth and fifth logical circuits to produce upon receipt of the output signal from said fourth logical circuit an output signal which is extinguished upon receipt of the output signal from said fifth logical circuit; a sixth logical circuit connected to said second logical circuit and said first flip-flop circuit for producing an output signal upon receipt of the output signal from said second logical circuit or the output signal from said first flip-flop circuit; a seventh logical circuit connected to said fifth logical circuit and said second flip-flop circuit for producing an output signal upon receipt of the output signal from said fifth logical circuit or the output signal from said second flip-flop circuit; and an eighth logical circuit connected to said sixth and seventh logical circuits for producing an output signal upon receipt of both the output signal of said sixth logical circuit and the output signal of said seventh logical circuit.

12. A trouble diagnosing device as claimed in claim 11, wherein each said first logical circuit includes exclusive OR gates, said second logical circuit comprises an OR gate, said third logical circuit comprises an AND gate, said fourth and fifth logical circuits each comprises an inverter said sixth and seventh logical circuits respectively comprising an OR gate and said eighth logical circuit comprises an AND gate.

13. A trouble diagnosing device as claimed in claim 11, wherein said trouble diagnosing circuit means further comprises a power cut-off and alarm means for cutting off power to said control circuit means and for generating a warning signal when the output signal of said trouble diagnosing circuit means indicates trouble in said operation control logical circuit means.

14. A trouble diagnosing device as claimed in claim 13, comprising wheel speed detector means for detecting the speed of respective wheels, relay switch means actuated upon brake application for connecting said operation and control logical circuit means to said wheel speed detector means and at the same time to disconnect said operation and control logical circuit means from said analog wheel speed signal oscillator means, said relay switch means during non-braking condition, disconnecting said operation and control logical circuit means from said wheel speed detector means and at the same time connecting said operation and control logical circuit means to said analog wheel speed signal oscillator means.

\* \* \* \* \*

UNITED STATES PATENT AND TRADEMARK OFFICE
CERTIFICATE OF CORRECTION

PATENT NO. : 4,270,809
DATED : June 2, 1981
INVENTOR(S) : TAIJI OHMORI et al

It is certified that error appears in the above-identified patent and that said Letters Patent are hereby corrected as shown below:

On the title page add:
(30) Foreign Application Priority Data

May 12, 1978    Japan        53-57035

May 24, 1978    Japan        53-62000.

Signed and Sealed this

Tenth Day of August 1982

[SEAL]

Attest:

GERALD J. MOSSINGHOFF

Attesting Officer    Commissioner of Patents and Trademarks